(12) United States Patent
Ahn et al.

(10) Patent No.: US 9,013,473 B2
(45) Date of Patent: Apr. 21, 2015

(54) GRAPHIC PROCESSING UNIT AND METHOD FOR DECOMPRESSING DATA

(75) Inventors: Min Su Ahn, Seoul (KR); Do Kyoon Kim, Seongnam-si (KR); Tae Hyun Rhee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 13/331,943

(22) Filed: Dec. 20, 2011

(65) Prior Publication Data

US 2012/0200559 A1 Aug. 9, 2012

(30) Foreign Application Priority Data

Feb. 9, 2011 (KR) ........................ 10-2011-0011447

(51) Int. Cl.
*G06T 15/00* (2011.01)
*G06T 9/00* (2006.01)
*H04N 19/20* (2014.01)
*H04N 19/436* (2014.01)

(52) U.S. Cl.
CPC . *G06T 15/00* (2013.01); *G06T 9/00* (2013.01); *H04N 19/20* (2013.01); *H04N 19/436* (2013.01)

(58) Field of Classification Search
None
See application file for complete search history.

(56) References Cited

U.S. PATENT DOCUMENTS

| 5,740,409 | A | 4/1998 | Deering |
| 7,071,935 | B1 * | 7/2006 | Deering et al. ............... 345/419 |
| 7,324,115 | B2 | 1/2008 | Fraser |
| 2006/0239543 | A1 * | 10/2006 | Ahn et al. ..................... 382/154 |
| 2007/0165035 | A1 * | 7/2007 | Duluk et al. .................. 345/506 |
| 2008/0034311 | A1 * | 2/2008 | Aguaviva et al. ............ 715/771 |
| 2008/0266287 | A1 * | 10/2008 | Ramey et al. ................. 345/419 |
| 2010/0158125 | A1 * | 6/2010 | Park et al. ............... 375/240.16 |

FOREIGN PATENT DOCUMENTS

| JP | 10-301841 | 11/1998 |
| JP | 11-232431 | 8/1999 |
| JP | 2005-004175 | 1/2005 |
| JP | 2006-203889 | 3/2006 |
| JP | 2007-166498 | 6/2007 |
| KR | 10-2000-0009807 | 2/2000 |
| KR | 10-2002-0017602 | 3/2002 |

* cited by examiner

*Primary Examiner* — Tize Ma
*Assistant Examiner* — Yu Chen
(74) *Attorney, Agent, or Firm* — NSIP Law

(57) ABSTRACT

A graphic processing unit (GPU) and method for decompressing compressed 3-dimensional (3D) compressed data. The GPU may extract segment information by analyzing a compressed data header and decompress segments included in a bit stream based on the segment information.

23 Claims, 6 Drawing Sheets

FIG. 7 ered threads.
GRAPHIC PROCESSING UNIT AND METHOD FOR DECOMPRESSING DATA

CROSS-REFERENCE TO RELATED APPLICATIONS

This application claims the priority benefit of Korean Patent Application No. 10-2011-0011447, filed on Feb. 9, 2011, in the Korean Intellectual Property Office, the disclosure of which is incorporated herein by reference.

BACKGROUND

1. Field

Example embodiments of the following description relate to a method for decompressing a 3-dimensional (3D) object data using a central processing unit (CPU) and a graphic processing unit (GPU).

2. Description of the Related Art

In general, 3-dimensional (3D) image data has a large capacity and consequently needs a large storage space, a high calculation capacity, and a high transmission bandwidth. Particularly, when 3D object data is output through a display, high bandwidths of both a central processing unit (CPU) and a graphic processing unit (GPU) are demanded.

Usually, when the 3D object data is in a compressed state, the CPU decompresses the compressed 3D object data and then transmits the decompressed 3D object data to the GPU. Therefore, the GPU outputs the decompressed 3D object data through the display.

In this instance, as the capacity of the 3D object data increases, the transmission rate between the CPU and the GPU is apt to reduce. Accordingly, the processing time until output of the 3D object data is increased.

Thus, when the CPU decompresses the 3D object data, a bottleneck situation between the CPU and the GPU may deteriorate or restrict processing and displaying of the 3D object data.

Accordingly, there is a desire for a process to reduce the bottleneck situation between the CPU and the GPU, to reduce the time required for decompressing the 3D object data, and to output the decompressed 3D object data.

SUMMARY

The foregoing and/or other aspects are achieved by providing a graphic processing unit (GPU) that decompresses compressed 3-dimensional (3D) object data in association with a central processing unit (CPU), the GPU including a segment information extractor to extract segment information by analyzing a compressed data header contained in a bit stream of compressed data received from the CPU; and a decompressor to decompress segments contained in the bit stream in parallel based on the segment information.

The GPU may further include a memory allocator to allocate a first memory space adapted to store the bit stream of the compressed data and a second memory space adapted to store a result of the decompression.

The GPU may further include a thread generator to generate threads adapted to decompress the segments based on the segment information.

The thread generator may generate the threads corresponding to the respective segments based on segment position information included in the segment information, and the decompressor may decompress the segments in parallel using the threads.

When a number of the segments is greater than a number of the threads generated based on the segment information, the decompressor may decompress part of the segments using the generated threads and then decompresses the other segments by reusing the generated threads.

The foregoing and/or other aspects are achieved by providing a recording medium storing a bit stream of compressed 3D object data transmitted by a CPU to a GPU, wherein the bit stream comprises a compressed data header and a plurality of segments.

The compressed data header may contain segment information, and the plurality of segments may be compressed in parallel based on the segment information.

The foregoing and/or other aspects are also achieved by providing a graphic processing method performed by a GPU that decompresses compressed 3D object data in association with a CPU, the method including extracting segment information by analyzing a compressed data header contained in a bit stream of compressed data received from the CPU; and decompressing segments contained in the bit stream in parallel based on the segment information.

The graphic processing method may further include allocating a first memory space adapted to store the bit stream of the compressed data; and allocating a second memory space adapted to store a result of decompressing the segments.

The graphic processing method may further include generating threads adapted to decompress the segments based on the segment information.

The graphic processing method may further include, when a number of the segments is greater than a number of the threads generated based on the segment information, decompressing part of the segments using the generated threads, and then decompressing the other segments by reusing the generated threads.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Reference will now be made in detail to example embodiments, examples of which are illustrated in the accompanying drawings, wherein like reference numerals refer to the like elements throughout. Example embodiments are described below to explain the present disclosure by referring to the figures.

Figure 1:
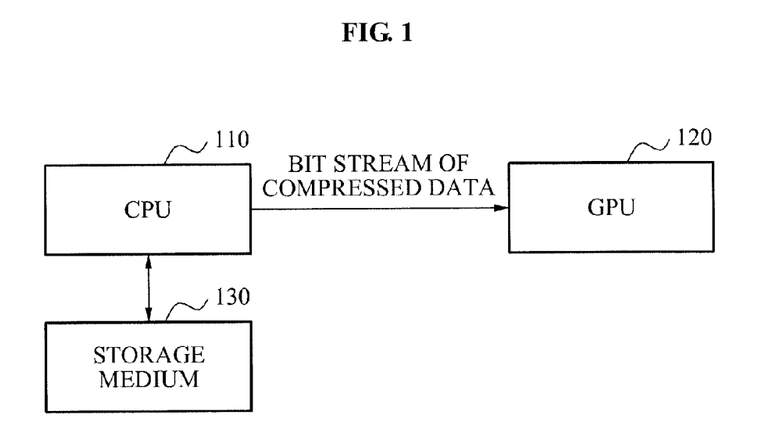
FIG. 1 illustrates a diagram showing a process where a central processing unit (CPU) and a graphic processing unit (GPU) decompress compressed data in association with each other, according to example embodiments.

FIG. 1 illustrates a diagram showing a process where a central processing unit (CPU) 110 and a graphic processing unit (GPU) 120 decompress compressed data in association with each other, according to example embodiments.

Referring to FIG. 1, the CPU 110 may transmit a bit stream of compressed data to the GPU 120. The compressed data may be 3-dimensional (3D) object data divided into a plurality of segments and compressed.

Figure 6:
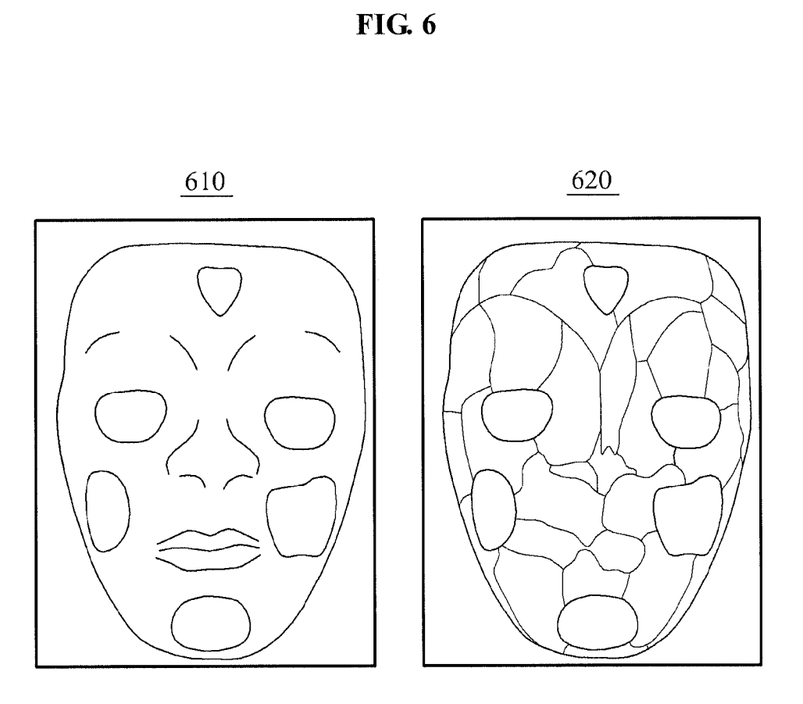
FIG. 6 illustrates a diagram for explaining 3D object data divided into a plurality of segments, according to example embodiments.

For example, the CPU 110 may read the compressed data from a storage medium 130 and transmit the compressed data to the GPU 120. When uncompressed 3D object data is read from the storage medium 130, as shown in FIG. 6, the CPU 110 may divide the 3D object data 610 into a plurality of segments 620 to compress the 3D object data 610.

For example, the CPU 110 may divide the 3D object data into the segments consisting of vertices having similar normals to compress the 3D object data.

As another example, the CPU 110 may compress the 3D object data into a plurality of segments based on the connection relationship among the vertices to compress the 3D object data. That is, the CPU 110 may divide the 3D object data into the segments consisting of vertices each having a similar number of neighboring vertices, to compress the 3D object data.

As described above, the CPU 110 may generate the bit stream of the compressed data by compressing the 3D object data. Here, the bit stream may be generated such that each of the segments corresponds to one of the faces constituting a base mesh. Accordingly, the bit stream of the compressed data may be gradually transmitted to the GPU 120. The bit stream of the compressed data may contain a compressed data header, that is, a header of the compressed data, and the segments. The segments may each contain a segment header and segment data.

Therefore, the GPU 120 may extract segment information by analyzing the compressed data header. In addition, the GPU 120 may decompress the segments in parallel based on the segment information.

In this instance, the GPU 120 may decompress the segments using threads respectively corresponding to the segments. The threads may be generated by the CPU 110 or the GPU 120.

For example, when an n-number of the segments exists, an n-number of the threads may be generated. Therefore, the GPU 120 may simultaneously decompress the n-number of segments using the n-number of threads. In other words, a thread 1 may decompress a segment 1, a thread 2 may decompress a segment 2, and, in this manner, a thread n may decompress a segment n. Here, the threads 1 to n may decompress the segments 1 to n simultaneously. Since the GPU 120 decompresses the segments thus in parallel, decompression time may be reduced.

However, when the segments are greater in number than the threads generatable by the GPU 120, the GPU 120 may decompress part of the segments using the generated threads first and then decompress the other segments by reusing the generated threads. For example, when the number of the segments is 2n and the number of the threads generatable by the GPU 120 is n, the GPU 120 may decompress the n-number of the segments first and, after the decompression is completed, may decompress the other n-number of the segments by reusing the n-number of the threads.

Figure 2:
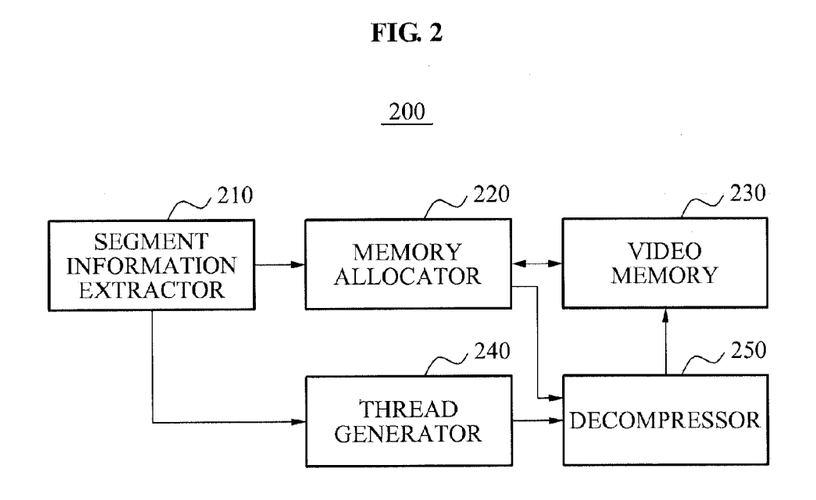
FIG. 2 illustrates a block diagram showing a structure of a GPU that decompresses compressed data received from a CPU, according to example embodiments.

FIG. 2 illustrates a block diagram showing a structure of a GPU 200 that decompresses compressed data received from a CPU, according to example embodiments.

Referring to FIG. 2, the GPU 200 may include a segment information extractor 210, a memory allocator 220, a video memory 230, a thread generator 240, and a decompressor 250.

The segment information extractor 210 may extract segment information by analyzing a compressed data header contained in a bit stream of compressed data received from the CPU.

The memory allocator 220 may allocate a first memory space among memory spaces constituting the video memory 230, the first memory space adapted to store the bit stream of the compressed data. Here, the memory allocator 220 may allocate the first memory space based on size information size of the bit stream included in the segment information. Therefore, the bit stream of the compressed data may be stored in the first memory space.

In addition, the memory allocator 220 may allocate a second memory space adapted to store a result of decompressing the segments, among the memory spaces constituting the video memory 230. Here, the memory allocator 220 may allocate the second memory space based on segment data size information included in the segment information.

Here, the second memory space may store vertex position information indicating vertex position in the GPU and vertex connection information indicating the connection relationship among the vertices, in order to output the 3D object data through the display.

The thread generator 240 may generate threads adapted to decompress the segments based on the segment information.

For example, the thread generator 240 may generate the threads respectively corresponding to the segments, based on segment number information and segment position information which are included in the segment information.

When an n-number of the segments exists, the thread generator 240 may generate an n-number of the threads based on the segment number information. More specifically, based on the segment information, the thread generator 240 may generate a thread 1 corresponding to a segment 1, a thread 2 corresponding to a segment 2, and, in this manner, a thread n corresponding to a segment n. That is, the thread generator 240 may match the segments to the threads, respectively, based on the segment position information.

Alternatively, the thread generator 240 may generate the threads based on the segment position information included in the segment information. In this case, the thread generator 240 may generate a smaller number of the threads than the segments.

When the number of the segments is greater than the number of the threads generatable by the thread generator 240, the decompressor 250 may decompress as many segments as the threads using the threads generatable by the thread generator 240. In addition, the decompressor 250 may reuse the threads to decompress the other segments.

The decompressor 250 may decompress the segments corresponding to the respective threads, in parallel using the threads.

Additionally, the decompressor 250 may store the vertex position information and the vertex connection information, which are a result of the decompression, per the segment in the second memory space. The vertex position information may include coordinates values of the vertices in a 3D space. The vertex connection information may include identification information of the vertices forming a face in the 3D space.

For example, when the segment 1 includes an n-number of vertices, the segment position information of the segment 1 may include a position coordinate value of a vertex 1 (x1, y1, z1), a position coordinate value of a vertex 2 (x2, y2, z2), . . . , a position coordinate value of a vertex 1 (xn, yn, zn). In addition, when the face is a triangle and when the segment 1 includes a k-number of triangles, the vertex connection information of the segment 1 may include identification information of vertices forming a triangle 1, identification information of vertices forming a triangle 2, . . . , and identification information of vertices forming a triangle k.

Accordingly, the decompressor 250 may store the vertex position information and the vertex connection information from a designated position of the second memory space per the segment, based on write address information contained in the segment header. Here, the write address information may include address information 1 indicating the start of storing the vertex position information in the second memory space, and address information 2 indicating the start of storing the vertex connection information in the second memory space. The address information 1 may be different according to the segment. Likewise, the address information 2 may be different according to the segment.

In an example case where address information 1 and address information 2 of the segment 1 are 10 and 20, respectively, and when address information 1 and address information 2 of the segment 2 are 30 and 40, respectively, the decompressor 250 may store the vertex position information of the segment 1 from an address number 10 of the second memory space and store the vertex connection information of the segment 1 from an address number 20 of the second memory space. In the same manner, the decompressor 250 may store the vertex position information of the segment 2 from an address number 30 and store the vertex connection information of the segment 2 from an address number 40.

With reference to FIG. 2, the embodiment has been explained that the GPU 200 allocates the first memory space to store the bit stream of the compressed data and the second memory space to store the decompression result of the segments, and generates the threads corresponding to the segments. However, not limited to the explained embodiment, the CPU may allocate the first memory space and the second memory space and generate the threads corresponding to the segments. In this case, the memory allocator 220 and the thread generator 240 of the GPU 200 may be omitted.

Figure 3:
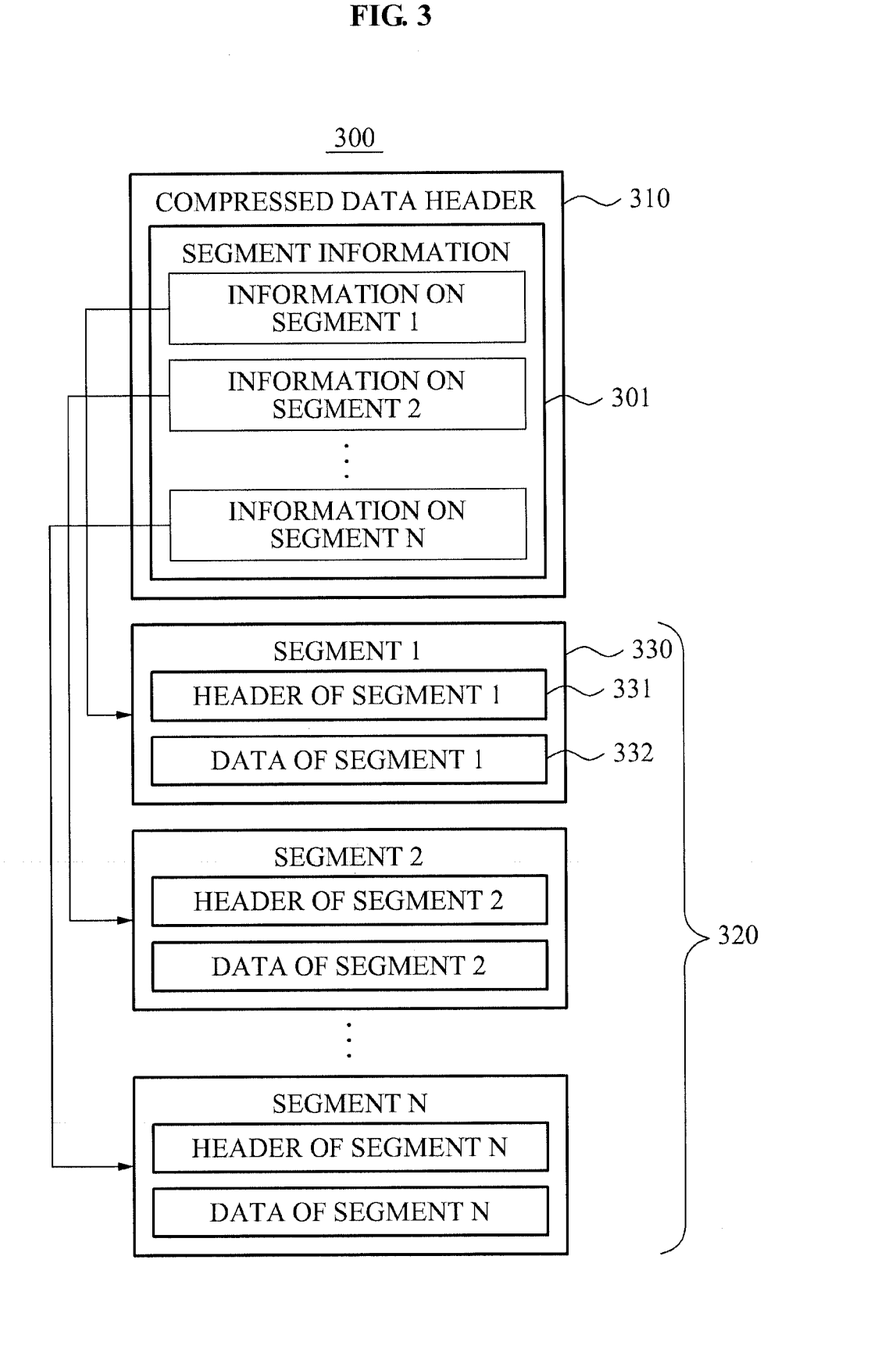
FIG. 3 illustrates a diagram showing a structure of a bit stream generated by compressing 3-dimensional (3D) object data, according to example embodiments.

FIG. 3 illustrates a diagram showing a structure of a bit stream 300 generated by compressing 3D object data, according to example embodiments.

Referring to FIG. 3, the bit stream 300 of the compressed data may include a compressed data header 310 and segments 320.

The compressed data header 310 may contain segment information 301 of the respective segments 320.

For example, when the CPU allocates the first memory space and the second memory space and generates the threads, the segment information 301 may include segment position information indicating positions of the respective segments in the bit stream.

As another example, when the GPU allocates the first memory space and the second memory space and generates the threads, the segment information 301 may include the segment position information, segment number information, segment size information, and bit stream size information.

In this instance, regardless of whether the memory space allocation and the thread generation is performed by the CPU or the GPU, the segment information 301 may further include information on a number of the vertices constituting the 3D object data and information on a number of the faces constituting the 3D object data. When a multi-resolution mode is supported, the segment information 301 may further include information on a number of levels.

In addition, each of the segments 320 may include a segment header and segment data. The segment header may contain at least one of quantization information indicating bits of the quantized segment 320, information on a number of the vertices of the segment 320, information on a number of the faces of the segment 320, and write address information. Also, the segment data may include vertex position information and vertex connection information.

For example, a segment 1 330 may include a segment 1 header 331 and segment 1 data 332. Therefore, the segment 1 header 331 may contain quantization information of the segment 1, information on a number of vertices of the segment 1, information on a number of faces of the segment 1, and write address information of the segment . Here, the write address information of the segment 1 may be used in storing the vertex position information and the vertex connection information of the segment 1 included in the segment 1 data 332 in the second memory space. The vertex position information and the vertex connection information may be acquired by decompressing the segment 1.

Figure 4:
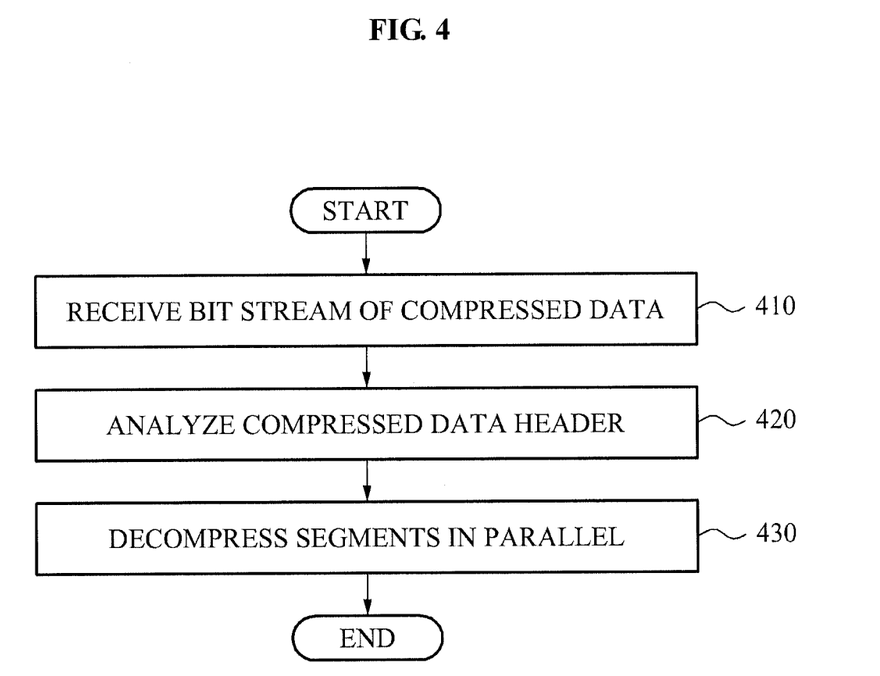
FIG. 4 illustrates a flowchart for explaining a process of decompressing segments included in a bit stream of compressed data in parallel, according to example embodiments.

FIG. 4 illustrates a flowchart for explaining a process of decompressing segments included in a bit stream 300 of compressed data in parallel, according to example embodiments.

In operation 410, the GPU may receive the bit stream 300 of the compressed data from the CPU. The bit stream 300 may be generated by compressing 3D object data, which includes a compressed data header and segments.

In operation 420, the GPU may analyze the compressed data header to extract segment information.

In operation 430, the GPU may decompress the segments in parallel based on the segment information. Here, the GPU may store, in a video memory, vertex position information and vertex connection information per the segment acquired by decompressing the segments.

For example, the GPU may decompress segments corresponding to threads, among the segments contained in the bit stream 300, based on the segment position information. Specifically, the GPU may decompress the segments corresponding to the threads in parallel, using the plurality of threads.

Hereinafter, a process of allocating a first memory space and a second memory space for parallel decompression of the segments and generating the threads corresponding to the segments will be described in detail.

Figure 5:
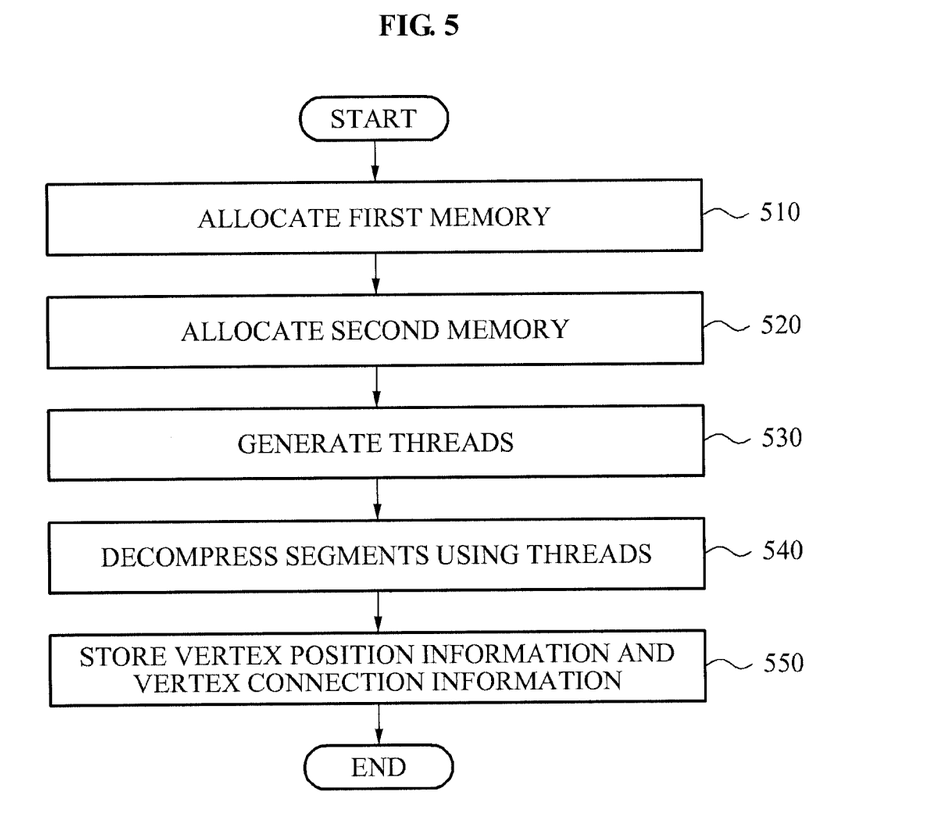
FIG. 5 illustrates a flowchart for explaining a process of decompressing segments in parallel by generating threads by a GPU, according to example embodiments.

FIG. 5 illustrates a flowchart for explaining a process of decompressing segments in parallel by generating threads by a GPU, according to example embodiments.

In operation 510, the GPU may allocate a first memory space adapted to store a bit stream of compressed data based on segment information. Therefore, the GPU may store the bit stream of the compressed data in the first memory space.

Specifically, the GPU may allocate the first memory space based on bit stream size information included in the segment information. When the first memory space is allocated by a CPU, the bit stream size information may be omitted from the segment information.

In operation 520, the GPU may allocate a second memory space adapted to store a result of decompressing the segments based on the segment information.

For example, the GPU may allocate the second memory space based on segment size information included in the segment information. Here, when the second memory space is allocated by the CPU, the segment size information may be omitted from the segment information.

In operation 530, the GPU may generate the threads corresponding to the segments, based on segment number information and segment position information which are included in the segment information. When the threads are generated by the CPU, the segment number information may be omitted from the segment information.

For example, when an n-number of the segments exists, the GPU may generate an n-number of the threads based on the segment number information. The GPU may match the segments to the threads, respectively, based on the segment position information. Thus, the GPU may generate the threads respective corresponding to the segments.

In operation 540, the GPU may decompress the segments corresponding to the threads in parallel, using the threads.

Specifically, when the number of the threads is n and the number of the segments is n, the threads may simultaneously decompress the corresponding segments. Through the decompression, the GPU may acquire vertex position information and vertex connection information per the segment.

Therefore, in operation 550 the GPU may store the vertex position information and the vertex connection information in the second memory space. Here, the GPU may store the vertex position information and the vertex connection information from a designated position of the second memory space, based on write address information contained in a segment header. Accordingly, the GPU may output 3D object data through a display based on the vertex position information and the vertex connection information stored in the second memory space.

Figure 7:
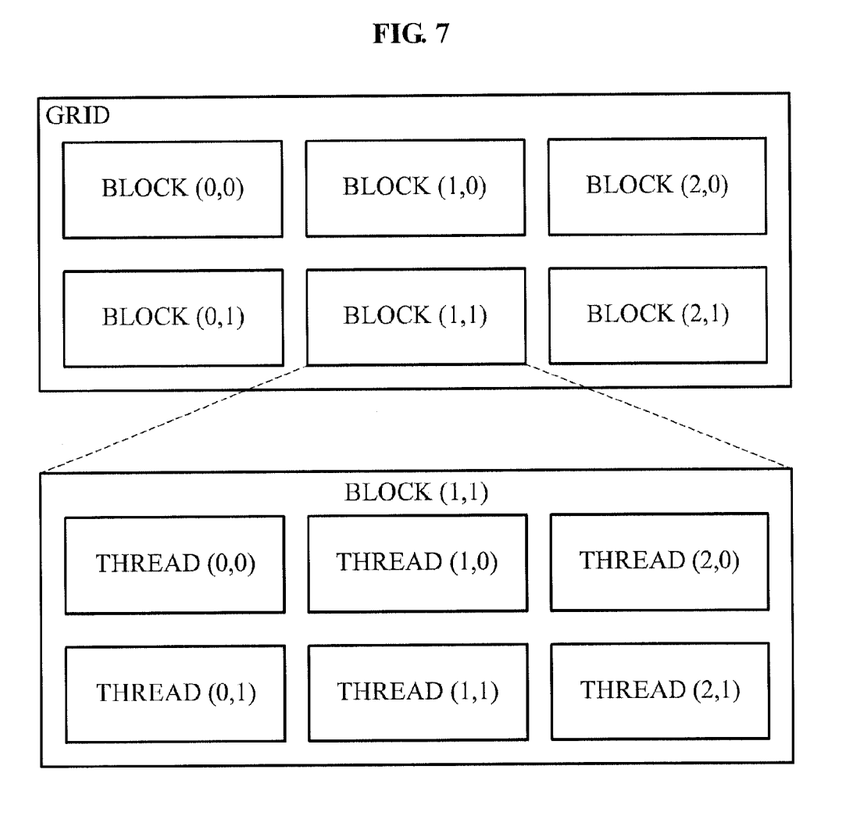
FIG. 7 illustrates a diagram for explaining a process of generating threads respectively corresponding to segments, according to example embodiments.

As described above, since a plurality of the threads access a video memory and decompress the segments in parallel as shown in FIG. 7, the GPU may reduce the decompression time and output the 3D object data more quickly.

With reference to FIG. 5, it has been explained that the GPU allocates the first memory space and the second memory space and generates the threads. However, allocation of the memory spaces may be performed by the CPU while the CPU performs generation of the threads.

In this case, the CPU may allocate the first memory space and the second memory space, and then transmit the bit stream of the compressed data to the GPU. Next, the GPU may store the bit stream of the compressed data in the first memory space and generate the threads corresponding to the segments.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A graphic processing unit (GPU) to decompress compressed 3-dimensional (3D) object data in association with a central processing unit (CPU), the GPU comprising:
   a segment information extractor to extract segment information included in a compressed data header, by analyzing the compressed data header included in a bit stream of compressed data received from the CPU; and
   a decompressor to
      decompress segments of the compressed 3D object data included in the bit stream based on the segment information, the compressed 3D object data being 3D object data divided into the segments and compressed, and
      store vertex position information and vertex connection information, which are a result of decompression, in a memory according to address information included in a segment header of each of the segments,
   wherein the segment header of at least one of the segments comprises a write address information, and
   wherein the write address information comprises address information indicating a start of the storing, in a second memory space, the vertex position information and the vertex connection information.

2. The GPU of claim 1, further comprising:
   a memory allocator to allocate a first memory space adapted to store the bit stream of the compressed data and the second memory space adapted to store a result of the decompression.

3. The GPU of claim 2, wherein
   the decompressor stores the vertex position information and the vertex connection information in the second memory space according to the write address information, and
   each of the segments comprises segment data including the vertex position information, the vertex connection information, and a segment header.

4. The GPU of claim 1, wherein the segment header further comprises at least one of quantization information indicating bits of a quantized segment, information on a number of vertices of the segment, and information on a number of faces of the segment.

5. Te GPU of claim 1, further comprising:
   a thread generator to generate threads adapted to decompress the segments based on the segment information.

6. The GPU of claim 5, wherein the segment information comprises at least one of a segment position information, a segment number information, a segment size information, and a bit stream information.

7. The GPU of claim 5, wherein
the thread generator generates the threads corresponding to the respective segments based on the segment position information, and
the decompressor decompresses the segments in parallel using the threads.

8. The GPU of claim 5, wherein, when a number of the segments is greater than a number of the threads generated based on the segment information, the decompressor decompresses a portion of the segments using the generated threads and then decompresses the remaining segments by reusing the generated threads.

9. The GPU of claim 1, further comprising:
a memory allocator to allocate the second memory space adapted to store a result of the decompression; and
a thread generator to generate threads respectively corresponding to the segments.

10. A non-transitory recording medium storing a bit stream of compressed 3-dimensional (3D) object data transmitted by a central processing unit (CPU) to a graphic processing unit (GPU),
wherein the compressed 3D object data is 3D object data divided into segments and compressed,
wherein the bit stream comprises a compressed data header and the segments of the compressed 3D object data,
wherein the compressed data header contains segment information of the segments,
wherein the segments are decompressed based on the segment information,
wherein vertex position information and vertex connection information, which are a result of decompression, are stored in a memory according to address information included in the segment header of each of the segments,
wherein the segment header of at least one of the segments comprises a write address information, and
wherein the write address information comprises address information indicating a start of the storing, in a second memory space, the vertex position information and the vertex connection information.

11. The non-transitory recording medium of claim 10, wherein the segment information comprises at least one of a segment number information, a segment size information, and a bit stream information.

12. A graphic processing method performed by a graphic processing unit (GPU) for decompressing compressed 3-dimensional (3D) object data in association with a central processing unit (CPU), the method comprising:
extracting segment information included in a compressed data header, by analyzing the compressed data header included in a bit stream of compressed data received from the CPU; and
decompressing segments of the compressed 3D object data included in the bit stream based on the segment information, the compressed 3D object data being 3D object data divided into the segments and compressed; and
storing vertex position information and vertex connection information, which are a result of decompression, in a memory according to address information included in a segment header of each of the segments,
wherein the segment header of at least one of the segments comprises a write address information, and
wherein the write address information comprises address information indicating a start of the storing, in a second memory space, the vertex position information and the vertex connection information.

13. The graphic processing method of claim 12, further comprising:
allocating a first memory space adapted to store the bit stream of the compressed data; and
allocating the second memory space adapted to store a result of decompressing the segments.

14. The graphic processing method of claim 13, wherein the decompressing comprises storing the vertex position information and the vertex connection information in the second memory space according to the write address information , and
each of the segments comprises segment data including the vertex position information, the vertex connection information, and a segment header.

15. The graphic processing method of claim 12, wherein the segment header further comprises at least one of quantization information indicating bits of a quantized segment, information on a number of vertices of the segment, and information on a number of faces of the segment.

16. The graphic processing method of claim 12, further comprising:
generating threads adapted to decompress the segments based on the segment information.

17. The graphic processing method of claim 16, wherein the segment information comprises a segment number information, a segment size information, and a bit stream information.

18. The graphic processing method of claim 16, further comprising:
the generating of the threads generates the threads respectively corresponding to the segments based on the segment position information included in the segment information, and
the decompressing decompresses the segments in parallel using the threads.

19. The graphic processing method of claim 16, wherein, when a number of the segments is greater than a number of the threads generated based on the segment information, the decompressing decompresses a portion of the segments using the generated threads and then decompresses the remaining segments by reusing the generated threads.

20. The graphic processing method of claim 12, further comprising:
allocating a first memory space adapted to store the bit stream of the compressed data;
allocating the second memory space adapted to store a result of decompressing the segments; and
generating threads respectively corresponding to the segments.

21. A non-transitory computer readable recording medium storing a program to cause a computer to implement the method of claim 12.

22. A computer system to decompress compressed 3-dimensional (3D) object data, the computer system comprising:
a segment information extractor to extract segment information from a compressed data header included in a bit stream of compressed data; and
a decompressor to
decompress segments of the compressed 3D object data included in the bit stream based on the segment information, the compressed 3D object data being 3D object data divided into the segments and compressed, and
store vertex position information and vertex connection information, which are a result of decompression, in a memory according to address information included in a segment header of each of the segments, wherein the segment header of at least one of the segments comprises a write address information, and wherein the write address information comprises address information indicating a start of the storing, in a second memory space, the vertex position information and the vertex connection information.

23. A graphic processing method performed by a graphic processing unit (GPU) for decompressing compressed 3-dimensional (3D) object, the method comprising:

extracting segment information from a compressed data header included in a bit stream of compressed data; and decompressing segments of the compressed 3D object data included in the bit stream based on the segment information, the compressed 3D object data being 3D object data divided into the segments and compressed; and storing vertex position information and vertex connection information, which are a result of decompression, in a memory according to address information included in a segment header of each of the segments, wherein the segment header of at least one of the segments comprises a write address information, and wherein the write address information comprises address information indicating a start of the storing, in a second memory space, the vertex position information and the vertex connection information.

* * * * *